United States Patent [19]

Negishi et al.

[11] Patent Number: 5,093,428
[45] Date of Patent: Mar. 3, 1992

[54] ANIONIC MATTE ELECTRODEPOSITION COATING COMPOSITION AND PROCESS FOR THE FORMATION OF MATTE FILM

[75] Inventors: Hiroyuki Negishi; Shinji Shirai, both of Hiratsuka, Japan

[73] Assignee: Kansai Paint Co., Ltd., Amagasaki, Japan

[21] Appl. No.: 450,828

[22] Filed: Dec. 14, 1989

[30] Foreign Application Priority Data

Dec. 20, 1988 [JP] Japan .................. 63-319400

[51] Int. Cl.$^5$ ........................... C08F 259/00
[52] U.S. Cl. ................... 525/276; 204/181.6
[58] Field of Search ........................... 525/276

[56] References Cited

U.S. PATENT DOCUMENTS 4,818,789  4/1989  Tomko et al. .................. 525/64

FOREIGN PATENT DOCUMENTS

2034608 A  2/1990  Japan.

OTHER PUBLICATIONS

Encyclopedia of Polymer Science and Engineering, vol. 3, p. 627 (1985).

Primary Examiner—John C. Bleutge
Assistant Examiner—D. E. Aylward
Attorney, Agent, or Firm—Fisher, Christen & Sabol

[57] ABSTRACT

Disclosed are an anionic matte electrodeposition coating composition containing, as a vehicle component, a polymer obtained by radical polymerization of a vinyl monomer comprising an alkoxysilane group-containing vinyl monomer as an essential component in the presence of a fluorocarbon polymer, and a process for forming a matte film which comprises coating the coating composition onto an aluminum material by electrodeposition coating.

7 Claims, No Drawings

ANIONIC MATTE ELECTRODEPOSITION COATING COMPOSITION AND PROCESS FOR THE FORMATION OF MATTE FILM

BACKGROUND OF THE INVENTION (1) Field of the Invention

This invention relates to an anionic matte electrodeposition coating composition and a process for forming a matte film preferably on an aluminum material.

(2) Description of the Prior Art

As an example of the electrodeposition coating compositions used for coating the aluminium material, there has been known an acrylic-melamine based water-soluble or water-dispersible coating composition, for example, there is used a water-soluble or water-dispersible coating composition which is obtained by mixing melamine resin as a crosslinking agent with a water-soluble or water-dispersible resin formed by neutralizing a polycarboxylic resin obtained by copolymerization of acrylic acid or methacrylic acid with other acrylic unsaturated monomer and/or ethylenically unsaturated monomer with ammonia or organic amine. The acrylic-melamine based electrodeposition coating composition has widely been used in coating building materials such as an aluminium sash used in the general houses and high buildings due to its good corrosion resistance and weather resistance.

However, although the acrylic-melamine based electrodeposition coating composition exhibits a satisfactory weather resistance when used in the general houses, the electrodeposition coating composition is quite incapable of satisfying recent requirements for durability over a long period of time of several decades when applied to building materials for use in buildings.

On the other hand, there has recently been developed a fluorocarbon polymer-melamine based electrodeposition coating composition as a coating composition capable of forming a highly durable film without being practically used so far because the fluorocarbon polymer is costly.

Further, in the field of the above coating composition, recent diversification in user's need shows a tendency to lose interest in feeling of metallic luster and highly demands matte film which provides grave feeling.

SUMMARY OF THE INVENTION

It is an object of the present invention to provide a coating composition which is capable of forming a matte film having good durability, i.e., high weather resistance over several decades and exhibiting excellent appearance, and a process for forming the matte film.

The present invention provides an anionic matte electrodeposition coating composition containing, as a vehicle component, a polymer obtained by radical polymerization of a vinyl monomer comprising an alkoxysilane group-containing vinyl monomer as an essential component in the presence of a fluorocarbon polymer, and a process for forming a matte film which comprises coating the coating composition onto an aluminum material by electrodeposition coating.

DETAILED DESCRIPTION OF THE INVENTION

The fluorocarbon polymer used as a vehicle component in the coating composition of the present invention may preferably include a hydroxyl group-containing fluorocarbon polymer obtained by copolymerizing a hydroxyl group-containing monomer, fluoroolefin and, optionally, other radically unsaturated monomer, or a carboxyl group-containing fluorocarbon polymer obtained by reacting the hydroxyl group-containing fluorocarbon polymer with a polybasic acid anhydride to esterify part or all of the hydroxyl groups in the polymer, and containing carboxyl group or containing carboxyl group and hydroxyl group.

The hydroxyl group-containing monomer includes ones having a radically polymerizable unsaturated double bond, which is radically copolymerizable with fluoroolefin, and hydroxyl group. Specific examples thereof include hydroxyalkyl vinyl ether such as hydroxyethyl vinyl ether, hydroxypropyl vinyl ether, hydroxybutyl vinyl ether, hydroxypentyl vinyl ether and the like.

The fluoroolefin used may include ones represented by the general formula:

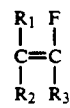

where $R_1$, $R_2$ and $R_3$ represent H, F and Cl, and are the same or different. Specific examples thereof include vinyl fluoride, vinylidene fluoride, trifluorochloroethylene, tetrafluoroethylene, and the like. Of these, tetrafluoroethylene and trifluorochloroethylene are preferred in that a matte film having good durability and appearance is obtained.

The other radically unsaturated monomer includes ones having an unsaturated double bond which is radically copolymerizable with the fluoroolefin and may be selected from conventionally known monomers depending on film performances as required to be used. Specific examples thereof include α-olefins such as ethylene, propylene, isobutylene, 1-butylene and the like; vinyl ethers such as ethyl vinyl ether, isobutyl vinyl ether, butyl vinyl ether, cyclohexyl vinyl ether; and the like.

The above monomers are formulated respectively in the range of 3 to 80% by weight of the hydroxyl group-containing monomer, 20 to 80% by weight of the fluoroolefin and 0 to 40% by weight of the other radically unsaturated monomer.

The hydroxy group-containing fluorocarbon polymer obtained by copolymerizing the above monomers may have a number average molecular weight of 2,000 to 100,000, preferably 5,000 to 60,000. When the number average molecular weight is less than 2,000, a satisfactory low gloss film is not formed. On the other hand, when the number average molecular weight is more than 100,000, the coating composition shows poor storage stability.

The carboxyl group-containing fluorocarbon polymer preferably used includes polymers prepared by reacting the hydroxyl group-containing fluorocarbon polymer with a polybasic acid anhydride to substitute an ester group represented by the general formula:

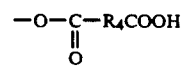

where $R_4$ represents a bivalent organic group, for at least a part of the hydroxyl groups in the polymer.

Specific examples of the polybasic acid anhydride include maleic anhydride, itaconic anhydride, succinic anhydride, phthalic anhydride, anhydrous 1,2-cyclohexane dicarboxylic acid and the like.

The carboxyl group-containing fluorocarbon polymer may have an acid value of about 5 to 150.

The vehicle component used in the coating composition of the present invention includes polymers obtained by radically polymerizing an alkoxysilane group-containing vinyl monomer or a mixture of the alkoxysilane group-containing vinyl monomer and the following monomers in the presence of the fluorocarbon polymer.

The above alkoxysilane group-containing vinyl monomer includes ones having a radically polymerizable unsaturated double bond and an alkoxysilane group. Specific examples thereof include divinyldimethoxysilane, divinyl-di-$\beta$-methoxyethoxysilane, vinyltrimethoxysilane, vinyl-tris-$\beta$-methoxyethoxysilane, $\gamma$-methacryloxypropyltrimethoxysilane, $\gamma$-methacryloxypropyltriethoxysilane, $\gamma$-methacryloxypropyldimethoxysilane and the like.

In addition to the alkoxysilane group-containing vinyl monomer, at least one monomer selected from a group consisting of $\alpha,\beta$-ethylenically unsaturated carboxylic acid, hydroxyl group-containing acrylic monomer and radically polymerizable unsaturated monomer is used in combination therewith. When used in combination, the alkoxysilane group-containing monomer may be used in an amount of 0.1% by weight or more and other monomers may be used in an amount of 99% by weight or less based on the total weight of all of the monomers.

Specific examples of the $\alpha,\beta$-ethylenically unsaturated carboxylic acid include acrylic acid, methacrylic acid, maleic acid, maleic anhydride, fumaric acid, crotonic acid, itaconic acid, and the like.

Specific examples of the hydroxyl group-containing acrylic monomer include 2-hydroxyethyl acrylate, hydroxypropyl acrylate, 2-hydroxyethyl methacrylate, hydroxypropyl methacrylate, and the like.

The other radically polymerizable unsaturated monomer used may include known monomers usually used for synthesis of acrylic resin, and specific examples thereof include $C_{1-18}$ alkyl esters of acrylic acid or methacrylic acid such as methyl acrylate, ethyl acrylate, propyl acrylate, isopropyl acrylate, butyl acrylate, hexyl acrylate, octyl acrylate, lauryl acrylate, cyclohexyl acrylate, methyl methacrylate, ethyl methacrylate, propyl methacrylate, isopropyl methacrylate, butyl methacrylate, hexyl methacrylate, octyl methacrylate, lauryl methacrylate and the like; vinyl aromatic monomers such as styrene, $\alpha$-methylstyrene, vinyl toluene and the like; amide compounds of acrylic acid or methacrylic acid; acrylonitrile, methacrylonitrile, and the like.

The process for radically polymerizing the above monomers in the presence of the fluorocarbon polymer may be carried out by reacting the above monomers at a temperature of normally about 0° to 180° C., preferably about 40° to 170° C. for about 1 to about 20 hours, preferably about 4 to about 10 hours by use of a radical polymerization catalyst in the presence of an organic solution of the fluorocarbon polymer.

The above solvent used may include a solvent which is inactive to the fluorocarbon polymer and the monomer and is capable of dissolving the fluorocarbon polymer and the monomer. Moreover, the above solvent preferably includes an organic solvent which does not dissolve the polymer obtained by radical polymerization of the monomer. Specific examples of such solvents include aliphatic hydrocarbon such as hexane, heptane, octane and the like; aromatic hydrocarbon such as benzene, toluene, xylene and the like; alcohols such as methyl alcohol, isopropyl alcohol, n-butyl alcohol, isobutyl alcohol, octyl alcohol and the like; ethers such as cellosolve, butyl cellosolve, diethylene glycol monobutyl ether and the like; ketones such as methyl isobutyl ketone, diisobutyl ketone, methyl ethyl ketone, methyl hexyl ketone, ethyl butyl ketone, and the like; esters such as ethyl acetate, isobutyl acetate, amyl acetate, 2-ethylhexyl acetate, and the like. These organic solvents may be used alone or in combination.

The polymerization of the above radically polymerizable unsaturated monomer is usually carried out by use of a radical polymerization initiator.

Examples of the radical polymerization initiator used include an azo initiator such as 2,2'-azobisisobutyronitrile, 2,2'-azobis(2,4-dimethylvaleronitrile), or the like; a peroxide initiator such as benzoyl peroxide, lauryl peroxide, tert-butyl peroctoate, tert-butylperoxy-2-ethylhexanoate or the like, and the like. These polymerization initiators may be used generally in an amount of 0.2 to 10 parts by weight, preferably 0.5 to 5 parts by weight per 100 parts by weight of the monomer used for the polymerization.

The amount of the fluorocarbon polymer used in the above polymerization may be selected from a broad range depending on film gloss, film surface conditions, film performances, etc. as required, but is generally in the range of 5 to 1000 parts by weight, preferably 10 to 500 parts by weight per 100 parts by weight of the monomer to be polymerized.

The concentration of a total amount of the fluorocarbon polymer and the radically polymerizable unsaturated monomer in the organic solvent is generally 30 to 70% by weight, preferably 30 to 60% by weight.

The above polymerization may be carried out according to a process known per se, that is, generally at a temperature of 60° to 160° C. for 1 to 15 hours.

Further, a radically polymerizable unsaturated double bond may be introduced into the above fluorocarbon polymer, and the monomer containing the above alkoxysilane group-containing vinyl monomer as an essential component may then be subjected to radical polymerization by use of the above initiator in the presence of the resulting fluorocarbon polymer to bond the fluorocarbon polymer with the vinyl polymer.

The introduction of the double bond into the fluorocarbon polymer may be carried out, for example, either by reacting the hydroxyl group-containing fluorocarbon polymer with the above $\alpha,\beta$-ethylenically unsaturated carboxylic acid or an isocyanate group-containing vinyl monomer such as isocyanate ethyl (meth)acrylate, $\alpha,\alpha$-dimethyl-m-isopropenylbenzyl isocyanate or the like, or by reacting the carboxyl group-containing fluorocarbon polymer with the hydroxyl group-containing acrylic monomer or a glycidyl group-containing unsaturated monomer such as glycidyl acrylate, glycidyl methacrylate, allylglycidyl ether or the like. The amount of the double bond to be introduced into the fluorocarbon polymer is satisfactorily at least 0.1 on an average in one molecule of the fluorocarbon polymer.

The polymer thus obtained may have an acid value of 10 to 150, preferably 30 to 120, and a hydroxyl value of 20 to 200, preferably 30 to 150. When the acid value is less than 10, the coating composition therefrom shows poor stability. On the other hand, when the acid value is greater than 150, it is impossible to provide a matte film having good durability. When the hydroxyl value is outside the above range, it is impossible to provide a matte film having good durability.

The organic solvent liquor of the polymer obtained by the radical polymerization reaction of the above monomer is then water-dispersed. The water-dispersing may be carried out either by adding water to a neutralized product obtained by neutralizing the organic solvent liquor with a basic substance, or by adding the neutralized product into water. The method of water-dispersing by adding water to the neutralized product is a method which comprises adding a neutralizing agent in a short period of time for neutralizing with agitation of the organic solvent liquor, followed by adding water in a short period of time until an oily phase is converted to an aqueous phase and by slowly dropping water until an intended solid content is reached to be water-dispersed. According to the above method, since hydrolysis and condensation reaction of the alkoxysilane group in the resin rapidly proceed in the presence of an acid or a base at and after the stage in which a neutralizing agent has been added, it is necessary to carry out the neutralization and addition of water in such a short period of time that thickening and gelation may not take place. The time of adding the neutralizing agent and the water to be added until the phase conversion is completed varies depending on a reactor, stirring conditions and environmental temperature, but is generally within 24 hours, preferably within 10 hours. On the other hand, the method of water-dispersing by adding the neutralized product into water comprises adding the neutralizing agent into the organic solvent liquor under agitation in a short period of time to obtain a neutralized product, followed by slowly adding the neutralized product with agitation into water to be water-dispersed. In this method too, since thickening and gelation may take place until addition of the neutralized product into water is completed, it is necessary to carry out the water-dispersing in as short period of time as possible. The time period from completion of the neutralization to completion of addition into water is generally within 24 hours, preferably within 10 hours.

Examples of the basic substances used for the water-dispersing include ammonia, methylamine, dimethylamine, trimethylamine, ethylamine, diethylamine, triethylamine, dimethyl ethanol amine, diethyl ethanolamine, diethanolamine, triethanolamine, and the like.

The basic substance is used in such an amount as to be about 0.1 to 1.5 equivalents, preferably about 0.5 to 1.2 equivalents to the carboxyl group in the vehicle component for neutralization.

The crosslinking agent used in the coating composition of the present invention may include conventionally known block isocyanate compounds, amino resin and the like. Examples of the amino resin may include melamine resin, benzoguanamine resin, urea resin and the like, preferably alkoxymethylate melamine resin which is methyl etherified ones or mixed etherified ones with alcohols having 4 carbons or less.

The crosslinking agent is used preferably in the range of 10% by weight to 60% by weight based on a total weight of the solid content of the vehicle component and crosslinking agent.

The coating composition of the present invention may optionally include hydrophilic solvents such as alcohol solvent, cellosolve solvent and the like, pigments and other conventionally used various additives.

The solid content of the electrodeposition coating bath in the case where the electrodeposition coating is carried out according to the present invention is preferably 4 to 15% by weight. When the solid content is less than 4% by weight, too high coating voltage is required. When the solid content is higher than 15% by weight, loss of the coating composition outside the coating process is so increased as to be uneconomical. The electrodeposition coating is carried out under the conditions of an electrodeposition coating bath temperature of 15° to 35° C., an applied voltage of 80 to 350 V and an applied voltage time of 1 to 5 minutes.

The coated product, which has been subjected to the electrodeposition coating, is washed with water and is then heat cured at 150° to 200° C. for 15 to 60 minutes to form an electrodeposition coating film having an intended matte effect.

The material to which the electrodeposition coating process of the present invention is applicable is not specifically limited so long as it has an electrical conductivity, but particularly includes aluminum or aluminum alloy, the use of which makes it possible to provide a uniform matte film having excellent properties in smoothness etc., and to form a film having film performances equal to those of the gloss clear coating in alkali resistance, acid resistance, and weather resistance, too.

According to the present invention, the vinyl polymer, which is obtained by polymerizing a vinyl monomer in the presence of the fluorocarbon polymer and a monomer component of which is an alkoxysilane group-containing vinyl monomer, has an alkoxysilane group on its side chain and is hydrolyzed to form a silanol when water-dispersed by addition of water, followed by condensation reaction between silanols to form siloxane linkage and to form dispersion particles, resulting in that a film obtained by the subsequent electrodeposition coating forms a fine rough surface and that the film does not completely show melt-flow even by the following heat curing to still form a fine rough surface and to obtain a matte film.

Generally, the matte film has poor film performances such as in weather resistance, alkali resistance and the like compared with the gloss film. Nevertheless, according to the present invention, the use of the fluorocarbon polymer for the polymerization of the alkoxysilane group-containing vinyl monomer makes it possible to form a matte film having excellent appearance and film performances.

The present invention will be explained more in detail by the following Examples and Comparative Examples, in which "part" and "%" are represented by weight.

EXAMPLE 1

An autoclave (50 kg/cm$^2$ pressure-resistant) is charged with 46 parts of hydroxybutyl vinyl ether (hereinafter referred to as HBVE), 29 parts of ethyl vinyl ether, 60 parts of diglyme, 180 parts of isopropyl alcohol and 1 ml of N-dimethylbenzylamine, followed by replacing the air therein by nitrogen, adding 116 parts of chlorotrifluoroethylene, and heating up to 65° C.

Next, 40 parts of a mixture of diglyme and isopropyl alcohol in a weight ratio of 1:1 and containing 2.5 parts of azobisisobutylonitrile dissolved therein is added to start polymerization reaction followed by maintaining at that temperature for 20 hours with agitation to obtain 471 parts of a varnish (A) having a solid content of 40%.

The above varnish (A) is heated at 60° to 80° C. under vacuum to remove the solvent.

Next, 15 parts of 1,2-cyclohexane-dicarboxylic acid anhydride and 100 μl of zirconium naphthenate to the varnish (A) with agitation, followed by heating refluxing acetone to be reacted for 5 hours. The resin thus obtained has a hydroxyl value of 81 and an acid value of 26.

Thereafter, a mixture of 50 parts of the above varnish (A) and 100 parts of isopropyl alcohol is kept at a reflux temperature of isopropyl alcohol, and a mixture of the following monomers (B) and initiator (C) is dropped thereinto over 5 hours, followed by aging for 2 hours.

| | |
|---|---|
| α-methacryloxypropyl-trimethoxysilane | 5 parts |
| acrylic acid | 7 parts |
| hydroxyethyl acrylate | 15 parts |
| styrene | 13 parts |
| methylmethacrylate | 30 parts |
| n-butylacrylate | 20 parts |
| ethylacrylate | 10 parts |
| azobisdimethylvaleronitrile | 1 part |

The resin thus obtained has a hydroxyl value of 74 and an acid value of 49. The resin solution is then cooled to 30° C. or lower, followed by neutralizing with triethylamine by 0.7 equivalent and adding 51 parts of CYMEL 303 (melamine resin marketed by Mitsui Toatsu Chemicals, Inc.) and deionized water to obtain a coating composition having a solid content of 12%.

An anodized 6063S aluminum alloy plate is dipped into the above coating composition as an electrodeposition coating bath to be subjected to electrodeposition coating at a bath temperature of 22° C. so as to form an electrodeposited film having a dry film thickness of 20 μm, followed by washing with water and by heat curing at 180° C. for 30 minutes to obtain a matte film. The above matte film shows such film performances as to have a 60° specular reflection percentage of 12%, good appearance, 100 remaining squares (on a coated surface is formed 100 of 1 mm square by use of a cutter knife. An adhesive cellophane tape is adhered to the squares, followed by strongly peeling the tape to observe a number of squares remaining without being peeled off as the adhesion properties test, and so forth.), weather resistance showing good appearance for 360 hours (represented by hours of "dew cycle", i.e. 60 minutes' irradiation and 60 minutes' darkness at a black panel temperature of 63° C. by use of a test instrument marketed by Suga Test Instrument Co., Ltd., and so forth.) and good alkali resistance (dipped in an aqueous 3% NaOH solution).

EXAMPLE 2

A mixture of 471 parts of the above varnish (A), 2.9 parts of glycidylmethacrylate, 0.02 part of p-tert-butylcatechol and 0.08 part of dimethylaminoethanol is reacted to introduce a double bond into the varnish (A) for obtaining a varnish (D).

Next, a mixture of the monomer (B) and the initiator (C) is polymerized in the same manner as in Example 1 by use of 50 parts of the varnish (D). The resin thus obtained has a hydroxyl value of 74 and an acid value of 48. Thereafter, the resin solution is cooled down to 30° C. or lower, followed by neutralizing with triethylamine by 0.7 equivalent, and adding deionized water to obtain a coating composition having a solid content of 12%. The coating composition has good stability.

The coating composition is used as an electrodeposition coating bath to carry out electrodeposition coating in the same manner as in Example 1 for obtaining a matte film. The matte film shows such film performances as to have a specular reflection percentage of 10%, good appearance, 100 remaining squares, weather resistance showing good appearance for 360 hours or more and good alkali resistance.

COMPARATIVE EXAMPLE 1

One hundred parts of isopropyl alcohol is kept at a reflux temperature of isopropyl alcohol and a mixture of the monomer (B) and the initiator (C) in the same amount as in Example 1 is dropped over 5 hours, followed by aging 2 hours, cooling down to 30° C. or lower, neutralizing with triethylamine by 0.7 equivalent and adding 42 parts of CYMEL 303 and deionized water to obtain a coating composition having a solid content of 12%.

The above coating composition is used as an electrodeposition coating bath for carrying out the electrodeposition coating to obtain a matte film. The matte film shows such film performances as to have a specular reflection percentage of 8%, a rough and uneven appearance, 100 remaining squares, weather resistance showing good appearance for 80 hours, a gloss retention of 45% and alkali resistance as to develop blisters.

What is claimed is:

1. An anionic matte electrodeposition coating composition containing, as a vehicle component, a polymer obtained by radical polymerization of a vinyl monomer comprising an alkoxysilane group-containing vinyl monomer as an essential component in the presence of a fluorocarbon polymer.

2. An anionic matte electrodeposition coating composition as claimed in claim 1, wherein the fluorocarbon polymer is a hydroxyl group-containing fluorocarbon polymer obtained by copolymerizing a hydroxyl group-containing monomer, fluoroolefin and, optionally, other radically unsaturated monomer.

3. An anionic matte electrodeposition coating composition as claimed in claim 2, wherein the fluoroolefin is tetrafluoroethylene and trifluoroethylene.

4. An anionic matte electrodeposition coating composition as claimed in claim 2, wherein the hydroxyl group-containing fluorocarbon polymer has a number average molecular weight of 2,000 to 100,000.

5. An anionic matte electrodeposition coating composition as claimed in claim 1, wherein the vinyl monomer is a monomer mixture of the alkoxysilane group-containing vinyl monomer with at least one monomer selected from the group consisting of α,β-ethylenically unsaturated carboxylic acid, hydroxyl group-containing acrylic monomer and radically polymerizable unsaturated monomer.

6. An anionic matte electrodeposition coating composition as claimed in claim 1, wherein the radical polymerization is carried out in the presence of a solvent which is capable of dissolving and is inactive to both the fluorocarbon polymer and the vinyl monomer and is incapable of dissolving the polymer obtained by radical polymerization.

7. An anionic matte electrodeposition coating composition as claimed in claim 1, wherein the fluorocarbon polymer is used in an amount of 5 to 1,000 parts by weight per 100 parts by weight of the vinyl monomer.

* * * * *